April 16, 1929.  C. P. PRITCHETT ET AL  1,709,739
MOTOR TRACTOR
Filed May 21, 1928
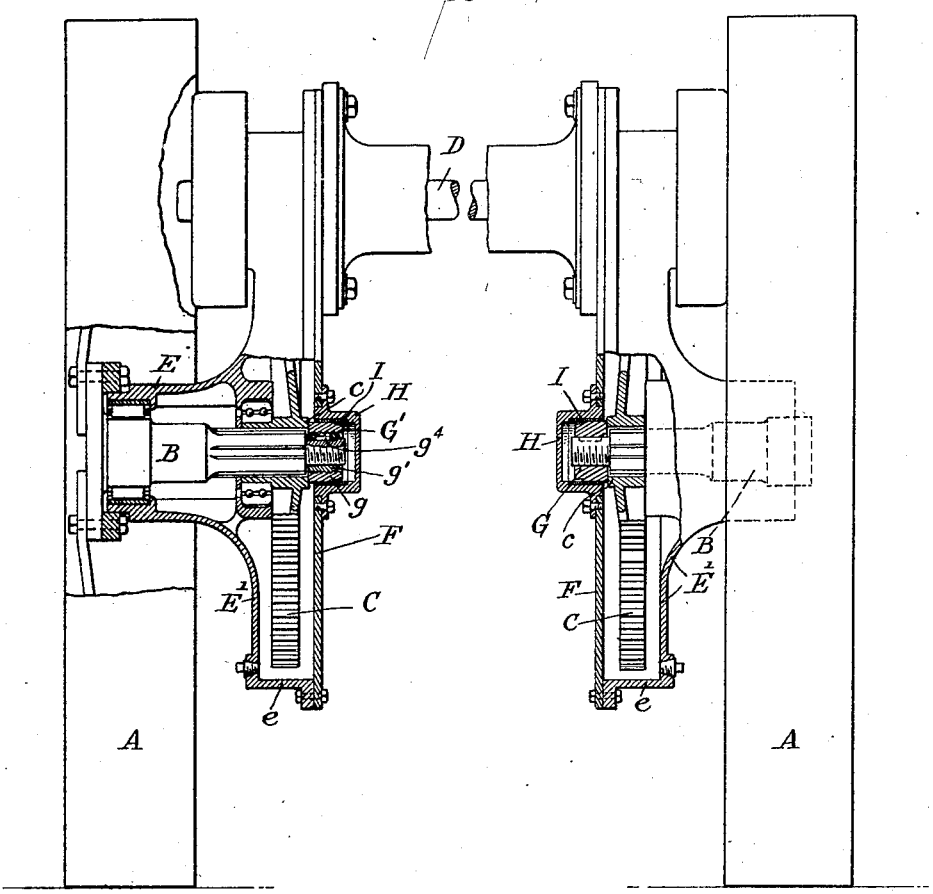
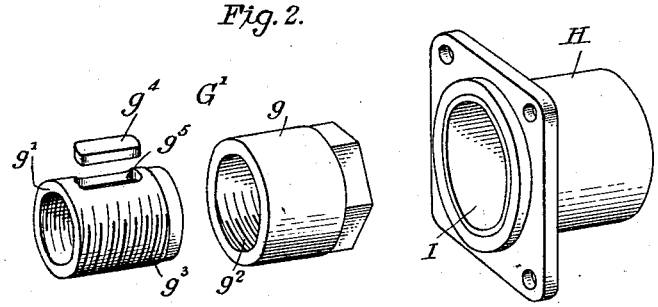
INVENTORS.
Claudius P. Pritchett
and Paul H. Williams
BY Dowell and Dowell
their ATTORNEYS.

Patented Apr. 16, 1929.

1,709,739

UNITED STATES PATENT OFFICE.

CLAUDIUS P. PRITCHETT AND PAUL H. WILLIAMS, OF MACON, GEORGIA.

MOTOR TRACTOR.

Application filed May 21, 1928. Serial No. 279,259.

This invention relates to tractors, and more particularly to an attachment for the rear wheel supports of tractors such as used for draft in connection with agricultural machinery.

The axles of the rear wheels of tractors of the kind referred to have their bearings in hub-like-portions of rear wheel supports or carriers, each of which is cast integrally with a vertically disposed annular member having an inwardly projecting circumferential flange to which is secured a carrier-plate between which and said casting there is a driving gear fixed on the axle or stub-shaft journaled in said hub-like member of said casting; the latter together with said rear wheel carrier providing a housing for said driving gear; the latter being secured to and adapted to revolve with said axle or stub-shaft. The carrier-plate has a central opening therein through which the inner end of the axle protrudes; said inner end being threaded and having screwed thereon a pair of jam-nuts arranged within a dust-cap which is bolted to said carrier-plate so as to protect the bearings against the admission of dust and dirt. Owing to the heavy strain upon the rear wheel in machines of the kind referred to, the rear wheel support or carrier is liable to and often breaks at a point where the hub-portion of the carrier merges into the aforesaid vertically disposed annular member, with consequent loss of time and expense incident to the necessity for removing the broken casting and substituting a new casting in its stead.

The objects of our invention are to provide simple and efficient means for relieving strain upon the carriers used in machines of the kind referred to and to adapt the carriers to sustain heavy strains without breaking.

The invention will first be hereinafter more particularly described, with reference to the accompanying drawings, which are to be taken as a part of this specification, and then pointed out in the claims at the end of the description.

In said drawings, Fig. 1 is a rear elevation of the rear wheels and rear wheel supports or carriers used in a Farmall tractor, the carriers and associated parts being shown in section with our invention applied thereto; and Fig. 2 is a detail perspective view of the several parts of an attachment embodying our invention, showing said parts in separated relation and in position for assembling the same.

Referring to said drawings, in which the same reference characters are used to denote corresponding parts in different views, the letters A, A, denote the rear wheels of the tractor each having rigidly secured thereto one end of a stub-shaft or axle B, on which is secured the hub $c$ of a peripherally toothed driving gear C, which engages a pinion (not shown) on a countershaft D, which is operably connected with the driving mechanism of the machine, for imparting rotary motion to the rear wheels of the tractor, as in the well known McCormick-Deering Farmall tractor. The stub-shafts or axles B have their bearings in hub-like-portions of rear wheel carriers or supports E, each of which is formed integrally with a vertically disposed or radially extending annular portion $E^1$, which terminates in a laterally projecting peripheral flange $e$ to which is secured the lower portion of a rear axle carrier-plate F having an opening therein through which protrudes the free end of the stub-shaft or axle B.

Between the hub of the driving gear C and the hub-portion of the carrier or rear wheel support E are secured annular ball bearings consisting of concentric rings and interposed balls running in ball races or grooves formed in the confronting surfaces of the rings, while annular roller bearings are interposed between the outer end-portion of the stub-shaft or axle and the outer end-portion of the hub-like member of the rear wheel support or carrier, so that when the gears C are revolved by the driven shaft D rotary motion will be imparted to the wheels A; said wheels being rigidly secured to the outer ends of the stub-shafts or axles and adapted to revolve therewith.

The parts thus far described are substantially identical with corresponding parts of the Farmall tractor, which our invention is designed to improve, except that in said tractors as ordinarily constructed the free ends of the stub-shafts or axles, which are threaded, protrude through the hub of the gear C into and through an opening in the carrier-plate F and have jam-nuts screwed thereon to retain the axle in operative position within the hub and prevent the axle from being withdrawn until such nuts are removed. To protect the bearings against the entrance of dust or dirt a light dust-cap is fitted over the opening through the carrier-plate so as to enclose the jam-nuts, and the dust-cap is secured to the carrier-plate and held firmly in place by means of four stud bolts.

In order to relieve the heavy strain upon the rear wheel and its carrier, in Farmall tractors as ordinarily constructed, and which are unprovided with a bearing at the free end of the stub-shaft, and as a result of which the carrier is liable to and does frequently break at or near the base of the radially extending portion or at a point where the latter merges into the hub-like portion of the carrier, we remove the light dust-cap and the jam-nuts heretofore used on the inner end of the axle and in place of the old dust-cap we secure to the carrier-plate a heavy dust-cap and bearing member combined, which is denoted by the letter H and may be secured to the carrier-plate by means of the same bolts that are used to hold the old dust-cap in place; and in place of the jam-nuts we screw upon the inner end of the axle a sleeve or collar G arranged within said bearing member, which serves the same purpose as the light dust-cap and at the same time serves to take undue strain off of the carrier and prevent the latter from being broken. The collar G bears against the outer end of the hub $c$ of the gear C, so as to prevent the axle from slipping out of the hub, and the bearing member H has secured therein a brass lining I, to provide a suitable bearing for the collar G which is revolubly fitted therein. The axles B as they come from the factory are each provided with key-ways and a threaded end on which jam-nuts are screwed and locked to hold the assembled parts together, and in running the machine, as there is a left hand thread on the left side, the bearing member or collar on that side would turn and become unscrewed, and to prevent this we provide on the left side a duplex collar or bearing member $G^1$ instead of a single collar, as on the right hand side; said duplex collar consisting of an outer interiorly threaded member $g$ and an inner exteriorly and interiorly threaded member $g^1$ which is screwed upon the axle while the outer member $g$ is screwed thereon; the latter member having an interior left hand thread $g^2$ for engagement with a left hand thread $g^3$ on the inner member $g^1$; and to prevent rotation of the inner member upon the axle when the parts are properly assembled a key $g^4$ is fitted in a slot $g^5$ in the body of the inner member and adapted to engage a key-way or groove in the axle and thus lock the latter member to the axle, so that when the gear C fixed on the axle B is rotated the journal bearing $G^1$ will rotate therewith without danger of being unscrewed.

The utility and advantages of our improvement will be readily understood from the foregoing description taken in connection with the accompanying drawings. The additional bearing on the inner end of the stub-shaft adds materially to the strength of the structure and relieves the strain upon the rear wheel carrier or casting so as to prevent the latter from breaking, thereby prolonging the life of the tractor. The improvement may be applied to any Farmall tractor by simply removing the light dust-cap and the jam-nuts heretofore used and substituting therefor the revoluble bearing member or collar and the co-operating combined bearing member and dust-cap, of the hereinbefore described construction, without making any other change in the construction of the tractor, and the work may be done by any ordinary mechanic, or any person of ordinary intelligence, without requiring the services of an expert.

It will be understood of course that the form and arrangement of parts constituting our invention may be varied without departing from the spirit and scope of the invention, and we therefore do not desire to be limited in the appended claims to the specific construction and arrangement shown and described, illustrating a preferred embodiment of our invention.

Having thus described our invention, what we claim as new and desire to secure by Letters Patent of the United States is:

1. In combination with the driving mechanism of a tractor and a rear wheel support or carrier comprising a hub-like-portion having a radially extending annular member provided with a laterally inwardly projecting peripheral flange and an axle carrier-plate secured to said flange and having a centrally disposed opening therein, a driving gear carried by a stub-shaft or axle projecting from a wheel supported by said carrier and having its bearings in said hub-like portion of the carrier; said gear being arranged between said wheel support and said carrier-plate, and said axle having its free end threaded and protruding through the hub of said gear and the opening in said carrier-plate, a collar screwed on said free end of the shaft and revoluble therewith, and a combined bearing member and dust-cap attached to said carrier-plate and enclosing said collar so as to provide a bearing for the inner end of the shaft.

2. In combination with the driving mechanism of a tractor and a rear wheel support comprising a hub-like portion having a radially extending annular member terminating in a laterally inwardly extending peripheral portion, and a centrally apertured axle carrier-plate secured to said terminal portion, a driving gear fixed on a spindle or stub-shaft projecting inwardly from a wheel carried by said support; said spindle having its bearings in said hub-like portion of said support and having its free end threaded and protruding through the hub of said gear and the aperture in said carrier-plate, a sleeve or collar screwed on the free end of said spindle and revoluble therewith, and a combined bearing member and dust-cap attached to said carrier-plate so as to enclose said collar and provide a bearing for the inner end of said spindle.

3. In combination with the driving mechanism of a tractor and a rear wheel support comprising a hub-like-portion having a radially extending annular member terminating in a laterally inwardly extending peripheral portion, and a centrally apertured axle carrier-plate secured to said terminal portion, a driving gear fixed on a spindle or stub-shaft projecting inwardly from a wheel carried by said support; said spindle having its bearings in said hub-like-portion of said support and having its free end threaded and protruding through the hub of said gear and the aperture in said carrier-plate; said gear engaging a pinion associated with said driving mechanism, a sleeve or collar screwed on the free end of said spindle and revoluble therewith, and a cup-like bearing member attached to said carrier-plate so as to provide a bearing for the inner end of said spindle.

4. In a motor tractor, the combination with suitable driving mechanism including a driven shaft having a pinion thereon, a rear wheel support comprising a hub-like-portion having a radially extending annular member terminating in a laterally inwardly extending peripheral portion, and a centrally apertured axle carrier-plate secured to said terminal portion, a stub-shaft or spindle projecting inwardly from a wheel carried by said support and having its free end threaded and protruding through the hub of said gear and the aperture in said carrier-plate; said spindle having its bearings in said hub-like-portion of said support, a driving gear fixed on said spindle and engaging the pinion on said driven shaft, a sleeve or collar screwed on the free end of said spindle and revoluble therewith, and a bearing member secured on the outer side of said carrier-plate so as to provide a bearing for the free end of said spindle.

5. In a tractor. the combination with suitable driving mechanism, including a driven shaft having a pinion thereon, a rear wheel support comprising a hub-like-portion having a radially extending annular member terminating in a laterally inwardly extending peripheral portion, and a centrally apertured axle carrier-plate secured to said terminal portion, a stub-shaft or spindle projecting inwardly from a wheel carried by said support and having its free end threaded and protruding through the hub of said gear and the aperture in said carrier-plate; said spindle having its bearings in said hub-like portion of said support, a driving gear fixed on said spindle and engaging the pinion on said driven shaft, a sleeve or collar screwed on the free end of said spindle and revoluble therewith, and a bearing member secured to said carrier-plate so as to provide a bearing for the free end of said spindle; said sleeve or collar consisting of inner and outer tubular members, one member being exteriorly and interiorly threaded and screwed into the other member and onto the end of the spindle, and means whereby the two members are caused to rotate together in one direction while permitting independent rotation of the inner member in the opposite direction.

In testimony whereof we affix our signatures.

PAUL H. WILLIAMS.
CLAUDIUS P. PRITCHETT.